S. T. STURDIVANT.
SWIVEL.
APPLICATION FILED MAY 11, 1914.
1,177,215.
Patented Mar. 28, 1916.
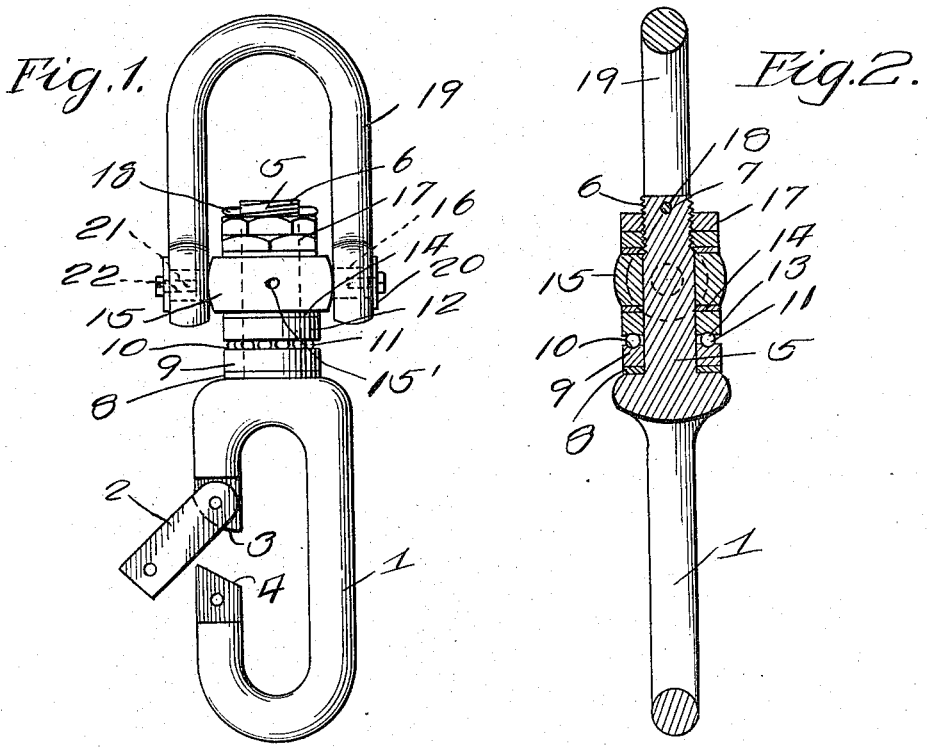
Witnesses
Inventor
S. T. Sturdivant
By
Attorneys

UNITED STATES PATENT OFFICE.

SAMUEL T. STURDIVANT, OF VINTON, LOUISIANA.

SWIVEL.

1,177,215.  Specification of Letters Patent.  Patented Mar. 28, 1916.

Application filed May 11, 1914. Serial No. 837,824.

*To all whom it may concern:*

Be it known that I, SAMUEL T. STURDIVANT, a citizen of the United States, residing at Vinton, in the parish of Calcasieu, State of Louisiana, have invented certain new and useful Improvements in Swivels; and I do hereby declare the following to be a full, clear, and exact description of the invention, such as will enable others skilled in the art to which it appertains to make and use the same.

This invention relates to a ball bearing C link.

An object of the invention is to provide a device which may be attached to a traveling block of a crane so as to prevent the supporting wires from twisting. It is to be understood, however, that although the device is particularly useful in this connection it may be used in various other places successfully.

A further object of the invention is to provide a device which is of such shape as to facilitate the placing a load thereon.

With these and other objects in view, such as will appear as the description progresses, my invention comprises the combination and arrangement of parts as herein set forth and subsequently claimed.

Referring to the drawing: Figure 1 is a side elevation of my device. Fig. 2 is a longitudinal sectional view thereof.

Referring to the drawing by reference characters wherein like characters represent like parts throughout the several views: My device comprises a C link 1 having a pivoted closure 2, the downwardly extending free end of this link is inclined from its outer edge downwardly to its inner edge, as at 3, while the upwardly extending free end is upwardly inclined outwardly, as at 4, and these ends are spaced from each other, thus forming a resultant angular opening.

Extending from the upper portion of the link 1 is a shank 5 having left hand threads 6 on the upper end thereof and an aperture 7 passing transversely therethrough.

Resting on the upper end of the C link and loosely mounted on the shank 5 at the lower end thereof is a washer 8 and on this washer and rotatably mounted on the shank 5 is a ball-bearing cup 9 having a groove 10 in its upper face. In this are located a series of ball-bearings 11 and resting on these bearings and encircling the shank 5 is a second cup member 12 having a groove 13 in its lower face. Resting on this cup member is a washer 14 and on the washer 14 is a collar 15 having outwardly extending trunnions 16 and a hole 15′ through which oil may be supplied onto the shank 5.

Screwed down upon the upper end of the shank 5 are nuts 17 which are held thereon against accidental disengagement therefrom by the cotter pin 18 which passes through the aperture 7 of the upper end of the shank 5.

Pivotally mounted on the trunnions 16 is a shackle member 19 which is held thereon by the washers 20 and the bolts 21 which engage threaded apertures 22 in the ends of the trunnions.

It may be thus seen that I have provided a device which will have movement around a horizontal pivot and also movement around a vertical pivot.

By screwing the nuts 17 down upon the upper end of the shank 5 the friction between the ball-bearings and the adjacent cups may be either increased or decreased as desired, and in fact the cups may be separated so that new ball-bearings may be placed therein.

By attaching this device to the traveling block of a crane and supporting the load therefrom all possibility of twisting of the operating cables, through a corresponding movement of the load, is obviated, this by reason of the swivel connection of the links through which the load is applied to the block.

By forming the entrance to the C link in the particular way described, the insertion of a member into the said link is facilitated and also the lifting of it therefrom.

It may be seen that I have provided a device which is exceedingly simple in construction and inexpensive, yet one which will completely do away with the possibility of cables to which it is attached twisting.

What is claimed is:—

In a device of the class described, the combination with a link having a shank extending upwardly therefrom, of a collar rotatably mounted on said shank and having outwardly extending trunnions, a shackle pivotally mounted on said trunnions, bearing cups mounted on the shank between the link and the collar and ball bearings disposed between said cups, the collar having an oil receiving opening therein through which oil may be inserted which oil will flow by gravity to the ball bearings.

In testimony whereof, I affix my signature, in the presence of two witnesses.

SAMUEL T. STURDIVANT.

Witnesses:
PATRICK DONOVAN,
W. W. STANDFIELD.

Copies of this patent may be obtained for five cents each, by addressing the "Commissioner of Patents, Washington, D. C."